United States Patent Office 3,080,417
Patented Mar. 5, 1963

3,080,417
ADDITION-HALOGENATED CYCLOHEXYL ESTERS
Irving Rosen, Painesville, Ohio, assignor to Diamond Alkali Company, Cleveland, Ohio, a corporation of Delaware
No Drawing. Filed Dec. 31, 1958, Ser. No. 784,032
12 Claims. (Cl. 260—487)

The present invention relates to novel addition-halogenated cyclic esters, cyclic imido carbonyl halides and cyclic isocyanates, the dehydrohalogenated products of these addition-halogenated compounds, and to novel methods of preparing and using such compounds.

In the past, compounds which contain strong electron-releasing atoms or groups, such as oxygen, phenol, phenol ethers and nitrogen in aniline and aniline derivatives, have not been addition-halogenated due to the ease with which they undergo substitution-halogenation even in the absence of catalysts commonly employed in addition-halogenation. It is, therefore, surprising that combining these electron-releasing atoms or groups with carbonyl-containing groups or their chemical equivalents, as disclosed hereinafter, permits addition-halogenation of such compounds to the practical exclusion of substitution-halogenation.

Addition-halogenated cyclic esters within the scope of the present invention may be represented by the structure:

(I)    $(X)_n$—(cycloalkyl group)—O—$R^1$ wherein $R^1$ is a radical selected from the group represented by the structures:

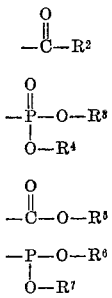

wherein X is halogen, i.e., fluorine, chlorine, bromine or iodine, chlorine being preferred; $R^2$, $R^3$, $R^4$, $R^5$, $R^6$ and $R^7$ are selected from the group consisting of hydrogen atoms, haloalkyl, cycloalkyl, halocycloalkyl, aryl and haloaryl radicals, $n$ is a number greater than 4, e.g., 4 to 11, inclusive, any free bonds being satisfied by hydrogen.

The term "cycloalkyl group" as used throughout the specification and claims is intended to refer to cyclic groups, i.e., those groups containing one or more rings, the preferred "cycloalkyl group" being a cyclohexyl group. Another illustrative cycloalkyl group within the scope of this definition is tetrahydrothienyl. The term "cycloalkylene" refers to cyclic groups containing one or more double bonds, e.g., tetrahydronaphthyl, cyclopentenyl and cyclohexenyl.

The term "haloalkyl" as used in the specification and claims is intended to refer to an alkyl radical having at least one halogen atom bonded to one or more carbon atoms of the radical, the preferred haloalkyl radicals being bromo- and chloro-lower-alkyl radicals, that is, haloalkyl-containing radicals having from 1 to 10 carbon atoms, such as, trichloromethyl, dichloromethyl, monochloromethyl, tribromomethyl, trifluoromethyl, tetrachloroethyl, tetrabromoethyl, tribromoethyl, pentachlorobutyl, diiodomethyl, hexachloropropyl, difluoromethyl and chlorodifluoromethyl. The term "haloaryl" as used in the specification and claims is intended to refer to aryl radicals which have at least one halogen atom substituted on the carbon atoms in the ring, the preferred haloaryl radicals being chlorophenyl and chloronaphthyl radicals; also included within the scope of this definition are bromophenyl, fluorophenyl and iodophenyl. The term "aryl" is also intended to include the aryl radicals previously stated, without halogen-substitution, preferred aryl radicals containing from 1 to 20 carbon atoms, such as phenyl, naphthyl and thienyl radicals, and the like.

Preferred addition-halogenated compounds of this invention are those within the scope of generic structure I in which the cycloalkyl group is a cyclohexyl group.

Also included within the scope of the present invention are those compounds represented by the structure:

(II)    $(X)_n$—(cycloalkyl group)—N=C=$R^8$ wherein $n$, X and "cycloalkyl group" are as previously defined, $R^8$ being selected from the group consisting of oxygen and halogen atoms, preferably chlorine atoms, any free bonds being satisfied by hydrogen.

Compounds within the scope of this invention, e.g., chlorocyclohexyl haloacetate esters, may be hydrolyzed to form chlorophenols, i.e., 2,4,6-trichlorophenol, under mild conditions. Such hydrolysis can be carried out via reaction with dilute acids such as dilute hydrochloric, sulphuric or nitric acid. This sequence of steps may be represented by the following structural reactions:

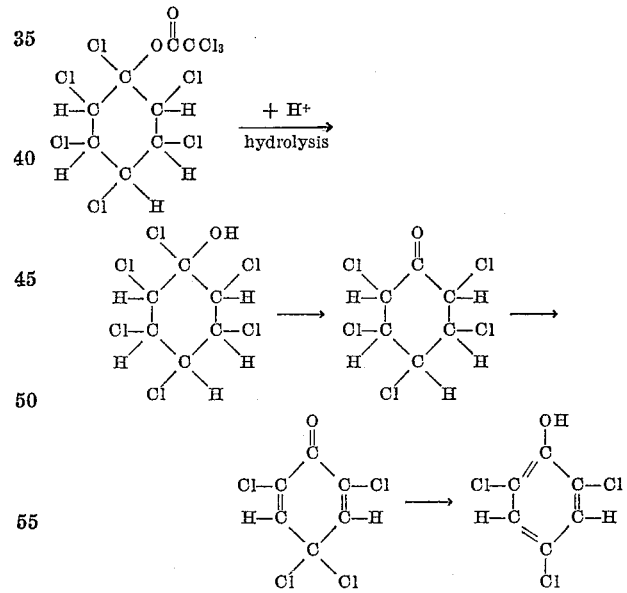

The acid hydrolysis may be effected by stirring a mixture of about .033 of a mol. of the addition-chlorinated compound of this invention in 60 ml. of a solvent such as dioxane, ethanol or methyl-ethyl ketone in the presence of 30 ml. of a concentrated acid, e.g., hydrochloric acid, and 60 ml. of water at reflux temperature for about 1 hour. The hydrolysis product may be separated by extraction with an organic solvent such as carbon tetrachloride or chloroform. The pure product may also be isolated through distillation, preferably at reduced pressure.

Compounds within the scope of this invention, i.e., those compounds within the scope of generic structures I and II above, may be prepared by chemically reacting a compound of the structures III or IV:

(III)   $(X)_a$—(cycloalkylene group)—O—$R^1$ with halogen in such a manner that the halogen adds to the above structure III rather than only substituting, that is, a halogen atom adds across a double bond between adjacent carbon atoms in the cycloalkyl group rather than substituting for a hydrogen attached to a carbon atom in the ring; wherein X and $R^1$ are as defined under structure I, $a$ being a number from 0 to 5, inclusive, any free bonds being satisfied by hydrogen.

The term cycloalkylene group is intended to refer to a "cycloalkyl group" as previously defined with a degree of unsaturation present within at least one ring, e.g., a cyclohexyl group containing at least one double bond within the ring. Specific examples of cycloalkylene groups within this definition are phenyl, naphthyl and cyclopentene radicals.

This addition-chlorination may be carried out at a temperature between −60° C. and +60° C. Typically, however, the compound of structure III is saturated with the halogen at room temperature and then while the halogen is added continuously, the reactant mixture is cooled, generally by contacting the reactor with Dry Ice to obtain a temperature of about −60° C., at which temperature the reactor or pressure tube is sealed and the reactant mixture allowed to warm to room temperature. Upon completion of the reaction, the reactant mixture is cooled and vented. The reaction typically requires between about 2 and 150 hours, e.g., 4 to 48 hours.

The halogen is added to the compound of structure II in an amount sufficient to cause halogen addition; however, it is ordinarily desirable to employ a slight excess over the theoretical amount required, such as about a 5 to 30% molar excess of the halogen. Normally one mole of a compound within the scope of structure III is mixed with 3 to 12 moles of the halogen. The reaction may be facilitated by the use of a solvent, such as carbon tetrachloride, perchloroethylene or hexachlorobutadiene. Ordinarily, up to about 8 moles of solvent is employed for every mole of compound within the scope of structure III.

The reaction requires the employment of a free radical catalyst, typically actinic radiation or an organic peroxide which will decompose at the desired reaction temperature, such as trichloroacetyl peroxide or benzoyl peroxide. However, the preferred catalyst is actinic radiation in the form of ultraviolet light, otherwise known as black light, or gamma radiation. The rate of reaction increases proportionately with the amount of catalyst or radiation present.

The resulting product may be purified through recrystallization from an organic solvent, recrystallization generally being required for the phosphate and imido carbonyl halide compounds, or through distillation, typically at reduced pressure, the latter procedure ordinarily being required for the organic esters. The esters within the scope of generic structure I typically boil above 50° C. and are insoluble in water but soluble in most common organic solvents, such as acetone, cyclohexanone and xylene.

The preferred preparation of this invention is the addition-halogenation, and specifically, the addition-chlorination, of phenyl esters. This process can be carried out by placing the phenyl ester in a Pyrex glass pressure reactor at room temperature with typically 0 to several ml. of carbon tetrachloride or other non-halogen reacting solvent. The desired amount of halogen is then added to this mixture. The mixture is then cooled, typically in Dry Ice, to about −50° C. to −60° C., and the reactor sealed. The mixture is then allowed to warm to room temperature, e.g., 20–35° C., and is radiated with ultraviolet light over a period of about 2 to 50 hours. The reactor is then cooled and vented, the resulting product being typically isolated through distillation at reduced pressure.

Compounds within the scope of structure II may be prepared by addition-halogenating, preferably addition-chlorinating, a compound represented by the structure:

(IV)   $(X)_p$—(cycloalkylene group)—N=C=$R^8$ wherein $p$ is a number up to 4, inclusive, e.g., 0 to 2, X is halogen, preferably chlorine, $R^8$ is selected from the group consisting of oxygen and halogen atoms, e.g., oxygen and chlorine atoms; any free bonds being satisfied by hydrogen. This addition-halogenation is carried out under essentially the same reaction conditions previously set forth, as in the addition-halogenation of a compound of structure III.

Illustrative reactions within the scope of this invention are given in Table I in which the compounds in column 1 are addition-halogenated with the halogen in column 2, under essentially the same reaction conditions taught previously, resulting in the desired addition-halogenation product disclosed in column 3.

TABLE I.—ADDITION-CHLORINATION OF PHENYL ESTERS

| Phenyl ester reactant | Halogen | Addition-halogenated product |
|---|---|---|
| Phenyl 2,2,3,3-tetrachloropropionate | Chlorine | 1,2,3,4,5,6-hexachlorocyclohexyl 2,2,3,3-tetrachloropropionate. |
| Phenyl 2,2-difluoro-3,3,3-trichloropropionate | do | 1,2,3,4,5,6-hexachlorocyclohexyl 2,2-difluoro-3,3,3-trichloropropionate. |
| Phenyl 2,2,3,3,3-pentafluoropropionate | do | 1,2,3,4,5,6-hexachlorocyclohexyl 2,2,3,3,3-pentafluoropropionate. |
| Phenyl 2,2,3,3-tetrachloropropionate | Bromine | 1,2,3,4,5,6-hexabromocyclohexyl 2,2,3,3-tetrachloropropionate. |
| Phenyl 2,2-difluoro-3,3-dichloropropionate | do | 1,2,3,4,5,6-hexabromocyclohexyl 2,2-difluoro-3,3-dichloropropionate. |
| Phenyl tribromoacetate | do | 1,2,3,4,5,6-hexabromocyclohexyl tribromoacetate. |
| Phenyl 2,3,3-trichloro-2-(trifluoromethyl)propionate | Fluorine | 1,2,3,4,5,6-hexafluorocyclohexyl 2,3,3-trichloro-2-(trifluoromethyl)propionate. |
| p-Chlorophenyl 2,2,3,3-tetrachloropropionate | Bromine | 1,2,3,4,5,6-hexabromo-4-chlorocyclohexyl 2,2,3,3-tetrachloropropionate. |
| p-Fluorophenyl 2,3-difluoro-2,3,3-trichloropropionate | Chlorine | 1,2,3,4,5,6-hexachloro-4-fluorocyclohexyl 2,3-difluoro-2,3,3-trichloropropionate. |
| p-Chlorophenyl 2,2,3,3,3-pentafluoropropionate | Fluorine | 4-chloro-1,2,3,4,5,6-hexafluorocyclohexyl 2,2,3,3,3-pentafluoropropionate. |
| p-Fluorophenyl 2,2,3,3-tetrachloropropionate | Bromine | 1,2,3,4,5,6-hexabromo-4-fluorocyclohexyl 2,2,3,3-tetrachloropropionate. |
| p-Chlorophenyl 3,3-dichloro-2,2-difluoropropionate | Chlorine | 1,2,3,4,5,6-heptachlorocyclohexyl 3,3-dichloro-2,2-difluoropropionate. |
| m-Fluorophenyl trifluoroacetate | do | 1,2,3,4,5,6-hexachloro-4-fluorocyclohexyl trifluoroacetate. |
| m-Chlorophenyl 2,3,3-trichloro-2-(trifluoromethyl)propionate | Bromine | 1,2,3,4,5,6-hexabromo-3-chlorocyclohexyl 2,3,3-trichloro-2-(trifluoromethyl)propionate. |
| p-Fluorophenyl 2,2,3,3,3-pentafluoropropionate | Chlorine | 1,2,3,4,5,6-hexachloro-4-fluorocyclohexyl 2,2,3,3,3-pentafluoropropionate. |

TABLE I—Continued

| Phenyl ester reactant | Halogen | Addition-halogenated product |
|---|---|---|
| p-Chlorophenyl benzoate | Fluorine | 4-chloro-1,2,3,4,5,6-hexafluorocyclohexyl 1,2,3,4,5,6-hexafluorocyclohexanecarboxylate. |
| Phenyl p-chlorobenzoate | Chlorine | 1,2,3,4,5,6-hexachlorocyclohexyl 1,2,3,4,4,5,6-heptachlorocyclohexanecarboxylate. |
| Tris(p-chlorophenyl)phosphate | do | Tris(1,2,3,4,4,5,6-heptachlorocyclohexyl)phosphate. |
| Tris(p-fluorophenyl)phosphate | Fluorine | Tris(1,2,3,4,4,5,6-heptafluorocyclohexyl)phosphate. |
| Tris(m-chlorophenyl)phosphate | do | Tris(3-chloro-1,2,3,4,5,6-hexafluorocyclohexyl)phosphate. |
| Bis(m-fluorophenyl)carbonate | Chlorine | Bis-(1,2,3,4,5,6-hexachloro-3-fluorocyclohexyl)carbonate. |
| Bis(p-chlorophenyl)carbonate | Bromine | Bis-(1,2,3,4,5,6-hexabromo-4-chlorocyclohexyl)carbonate. |
| 2-naphthyl trichloroacetate | Chlorine | 1,2,3,4-tetrachloro-1,2,3,4-tetrahydro-2-naphthyl trichloroacetate. |
| 1-naphthyl trichloroacetate | do | 1,2,3,4-tetrachloro-1,2,3,4-tetrahydro-1-naphthyl trichloroacetate. |
| 2-thienyl trichloroacetate | Bromine | 1,2,3,4-tetrabromotetrahydro-2-thienyl trichloroacetate. |
| 3-thienyl trichloroacetate | Chlorine | 1,2,3,4-tetrachlorotetrahydro-3-thienyl trichloroacetate. |
| 6-chloro-2-naphthyl trichloroacetate | do | 1,2,3,4,6-pentachloro-1,2,3,4-tetrahydro-2-naphthyl trichloroacetate. |
| p-Chlorophenyl isocyanate | Fluorine | 4-chloro-1,2,3,4,5,6-hexafluorocyclohexyl isocyanate. |
| Hydroquinone bis-(trichloroacetate) | Bromine | 1,2,3,4,5,6-hexabromocyclohexane-1,4-diol bis(trichloroacetate). |

While compounds of this invention may be employed in a variety of applications, biological or otherwise, when employed as biologically-active materials, it will be understood, of course, that such compounds may be utilized in diverse formulations, both liquid and solid, including finely-divided powders and granular materials, as well as liquids, such as solutions, concentrates, emulsifiable concentrates, slurries, and the like, depending upon the application intended and the formulation media desired.

These compounds may be used alone or in combination with other known biologically-active materials, such as other pesticides, insecticides, foliage and soil fungicides, pre- and post-emergent herbicides, and the like.

Thus, it will be appreciated that compounds of this invention may be employed to form biologically-active substances containing such compounds as essential active ingredients thereof, which compositions may also include finely-divided dry or liquid diluents, extenders, fillers, conditioners, including various clays, diatomaceous earth, talc, spent catalyst, alumina-silica materials, liquids, solvents, diluents, or the like, including water and various organic liquids, such as benzene, toluene, chlorinated benzene, acetone, cyclohexanone, xylene, carbon disulfide, carbon tetrachloride, petroleum distillate fractions and various mixtures thereof.

When liquid formulations are employed or dry materials prepared which are to be used in liquid form, it is desirable in certain instances additionally to employ a wetting, emulsifying, or dispersing agent to facilitate use of the formulation, e.g., Triton X–155 (alkyl aryl polyether alcohol, U.S. Patent No. 2,504,064). Suitable surface active agents are set forth in an article by John W. McCutcheon in "Soap and Chemical Specialties," vol. 31, pages 7–10 (1955).

The term "carrier" as employed in the specification and claims is intended to refer broadly to the materials constituting a major proportion of a biologically-active material or other formulation and hence includes finely-divided materials, both liquids and solids, as aforementioned, conventionally used in such applications.

In order that those skilled in the art may more completely understand the present invention and the preferred methods by which the same may be carried into effect, the following specific examples are offered:

*Example 1*

PREPARATION OF 1,2,3,4,5,6-HEXACHLOROCYCLOHEXYL TRICHLOROACETATE 0.10 mol. (24.0 g.) of phenyl trichloroacetate is placed in a 100 ml. Pyrex pressure tube. The tube is then cooled to about −50° C. employing Dry Ice while continuously adding chlorine. Upon the addition of 0.30 mol. (21.4 g.) of chlorine, the tube is sealed, placed in the presence of black light and allowed to warm to room temperature. The reaction mixture is then allowed to stand for a period of about 22 hours in the presence of the actinic radiation, followed by cooling and venting. The resultant crude addition-chlorination product is vacuum distilled and the desired 1,2,3,4,5,6-hexachlorocyclohexyl trichloroacetate, $C_8H_5Cl_9O_2$, is isolated at 160°–164° C. employing 0.4 mm. mercury pressure. This pure product is also indicated by the following elemental analytical data:

| Element | Actual percent by weight | Calculated percent by weight |
|---|---|---|
| C | 21.15 | 21.25 |
| H | 1.16 | 1.11 |
| Cl | 70.6 | 70.5 |

*Example 2*

Insecticidal utility of 1,2,3,4,5,6-hexachlorocyclohexyl trichloroacetate is shown in using the bean aphid, *Aphis fabae*, which is cultured on nasturtium plants. The nasturtium plants are infested with approximately 100 aphids at the time of treatment. The test plants are treated by pouring a test formulation (2000 p.p.m. of the product of Example 1—5% acetone–0.01% Triton X-155–balance water) on the soil at a rate equivalent to 64 lbs./acre. Insect mortality of better than 85% is observed 24 hours after treatment.

*Example 3*

Spore germination tests on glass slides are conducted via the test tube dilution method adopted from the procedure recommended by the American Phytopathological Society's committee on standardization of fungicidal tests. In this procedure, the product of Example 1, in aqueous formulations at concentrations of 1000, 100, 10 and 1.0 p.p.m., is tested for its ability to inhibit germination of spores from 7 to 10-day-old cultures of *Alternaria oleracea* and *Monilinia fructicola*. Germination records are taken after 20 hours of incubation at 22° C. by counting 100 spores. Results indicate that a concentration of 0.1–1.0 p.p.m. affords disease control for both the *A. oleracea* and *M. fructicola*.

*Example 4*

Further fungicidal activity is indicated by applying the product of Example 1 to the soil around 10-day-old pinto bean plants in a test formulation (2000 p.p.m. product of Example 1—5% acetone–0.01% Triton X-155–balance water). The concentration of test chemical used is equivalent to 128 lbs./acre. Immediately following application of the test chemical to the soil surrounding the plants, the plants are sprayed with a spore suspension of the rust fungus, *Uromyces phaseoli*. This spore suspension is prepared by mixing 30 mg. of freshly harvested spores with 48 mg. of talc. This is then diluted with water at the rate of about 1 mg. of the talc-spore mixture to 1.7 ml. of distilled water.

After spraying the spores on the seed leaves of the bean plants, they are placed in a 100% humid atmosphere for 24 hours at 60° F. After incubation, the plants are removed to controlled greenhouse conditions and, 9 to 10 days after exposure, the rust lesions are counted. The data observed are converted to percentage disease control based on the number of lesions observed on the control plants. Using this procedure, the product of Example 1 causes greater than 95% disease control.

*Example 5*

Seeds of perennial rye grass and radish are treated in Petri dishes with aqueous suspensions of the product of Example 1 (1000 or 100 p.p.m. product of Example 1—5% acetone–0.01% Triton X-155–balance water). Lots of 25 seeds of each type are scattered in separate dishes containing filter paper discs moistened with 5 ml. of the test formulation at each concentration. After 7 to 10 days under controlled conditions, the test compound is given a rating which corresponds to the concentration that inhibits germination of half of the spores (ED 50) in the test or greater. Using this test, the product of Example 1 receives ratings of 1000 p.p.m. for the radish and 10–100 p.p.m. for the rye grass species.

*Example 6*

To evaluate the effect of the product of Example 1 upon the germination of seeds in soil, a mixture of seed of six crop plants is broadcast in 8 x 8 x 2 inch metal cake pans filled to within ½ inch of the top with composted greenhouse soil. The seed is uniformly covered with about ¼ inch of soil and watered. After 24 hours, 80 ml. of an aqueous test formulation (320 mg. product of Example 1—5% acetone–0.01% Triton X-155–balance water) is spread uniformly over the surface of the pan. This is equivalent to application at the rate of 64 lbs./acre. The seed mixture contains representatives of three broadleaf plants: turnip, flax, and alfalfa, and three grass plants: wheat, millet, and rye grass. Two weeks after treatment, records are taken on seedling stand as compared to the controls. Using this procedure, results indicate that 75% of the broadleaf seeds emerge while none of the grass seeds emerge, thus indicating selective pre-emergent herbicidal activity.

*Example 7*

In order to make an in vitro evaluation of the product of Example 1 as a contact poison, non-plant parasite nematodes (*Panagrellus redivivus*) are exposed to the product of Example 1 in small watch glasses (27 mm. diameter x 8 mm. deep), within a 9 cm. Petri dish. An aqueous test formulation (500 p.p.m. product of Example 1—5% acetone–0.01% Triton X-155–balance water) is used. Results are recorded 24 hours after treatment indicating 100% nematode mortality at a concentrataion of 500 p.p.m.

*Example 8*

Evaluation of the product of Example 1 as a fumigant poison is carried out by exposing non-plant parasite nematodes (*Panagrellus redivivus*) to the test chemical in small watch glasses (27 mm. diameter x 8 mm. deep) within a 9 cm. Petri dish. A test formulation containing 1 mg. of the product of Example 1—5% acetone–0.01% Triton X-155–balance water is used. Observations after 24 hours indicate better than 85% nematode mortality.

*Example 9*

PREPARATION OF 1,2,3,4,5,6-HEXACHLOROCYCLOHEXYL TRIFLUOROACETATE 0.26 mol. of phenyl trifluoroacetate is placed in a Pyrex pressure tube and saturated with chlorine. The temperature of the reactant mixture is then lowered to about −50° C. by cooling in Dry Ice with constant chlorine addition. The pressurized tube is then sealed, and the reactants are allowed to warm to room temperature while in the presence of black light. The tube and contents are allowed to remain in the presence of the black light at room temperature for a period of about 15 hours after which the reactants are cooled and the tube vented. The crude reaction product is then isolated by distillation, and the fraction boiling at 120°–123° C. at 1.1 mm. mercury pressure is collected. The resulting 1,2,3,4,5,6-hexachlorocyclohexyl trifluoroacetate, $C_8H_5Cl_6F_3O_2$, having a refractive index of $$n\frac{1.4910}{D}$$

at 26° C., is indicated by the following elemental analytical data:

| Element | Actual percent by weight | Calculated percent by weight |
|---|---|---|
| C | 23.23 | 23.82 |
| H | 1.27 | 1.25 |
| Cl | 53.3 | 52.8 |

*Example 10*

Fungicidal activity of the product of Example 9 is determined employing the procedure given in Example 3. In this test, the product of Example 9 affords disease control for the *A. oleracea* and *M. fructicola* at a concentration of 0.1–1.0 p.p.m.

*Example 11*

A tomato foliage disease test is conducted measuring the ability of the product of Example 9 to protect tomato foliage against infection by the early blight fungus, *Alternari solani*. Tomato plants 5 to 7 inches high of the variety Bonny Best are employed. The plants are sprayed with 100 ml. of a test formulation (400 p.p.m. product of Example 9—5% acetone–0.01% Triton X-155–balance water) at 40 lbs. air pressure while being rotated on a turntable in a spray chamber. After the spray deposit is dry, the treated plants, and comparable untreated controls, are sprayed with a spore suspension containing approximately 20,000 conidia of *A. solani* per ml. The plants are held in a 100% humid atmosphere for 24 hours at 70° F. to permit spore germination and infection. After 2 to 4 days, lesion counts are made on the three uppermost fully expanded leaves. Data based on the number of lesions obtained on the control plants show better than 60% disease control.

*Example 12*

In order further to demonstrate fungicidal activity of the product of Example 9, tomato, variety Bonny Best, plants growing in 4 inch pots are treated by pouring a test formulation (2000 p.p.m. product of Example 9—5% acetone–0.01% Triton X-155–balance water) into the pots at a rate equivalent to 128 lbs./acre (102 mg./pot). The tomato plants are 3 to 4 inches tall and the trifoliant leaves just starting to unfoid at time of treatment. The plants are exposed to early blight disease and after 10 to 14 days, observation indicates that the product of Example 9 causes 50% blight control.

*Example 13*

The product of Example 9 also demonstrates nematocidal activity employing the procedure given in Example 7. The product of Example 9 causes 100% nematode mortality at a concentration of 500 p.p.m.

*Example 14*

The product of Example 9 also is an active non-plant parasite nematode fumigant poison as demonstrated by employing the test given in Example 8. Results indicate that the product of Example 9 causes 100% nematode mortality when employed at a concentration of 1 mg.

Example 15

PREPARATION OF 1,2,3,4,5,6-HEXACHLOROCYCLOHEXYL CHLOROACETATE 0.20 mol. of phenyl chloroacetate and 21.4 ml. of carbon tetrachloride are placed in a pyrex glass pressure tube. The reactant mixture is then cooled to about −50° C. by immersion in a Dry Ice bath while chlorine is added continuously (0.62 mol. of chlorine is employed). After addition of the chlorine, the tube is sealed and allowed to warm to room temperature in the presence of black light. The reactants are allowed to remain in the presence of black light, and at room temperature for a period of about 18 hours at which time they are cooled in Dry Ice again and vented. The resulting product is then distilled, the desired fraction boiling at 166°–172° C. at 1.2 mm. mercury pressure, yielding the desired $C_8H_7Cl_7O_2$, having a refractive index of $$n\frac{1.5558}{D}$$

at 26° C. and further indicated by the following elemental analytical data:

| Element | Actual percent by weight | Calculated percent by weight |
|---|---|---|
| C | 25.00 | 25.05 |
| H | 1.92 | 1.84 |
| Cl | 65.6 | 64.9 |

Example 16

Systemic fungicidal activity of the product of Example 15 is indicated employing the procedure given in Example 2 previously. In this test, the product of Example 15 affords better than 50% aphid control when applied at a concentration equivalent to 64 lbs./acre.

Example 17

The product of Example 15 is an active fungicide as indicated employing the procedure given in Example 11. In this test, the product of Example 15 causes greater than 90% early blight control at a concentration of 2000 p.p.m.

Example 18

The product of Example 15 is also systemically active against the early blight fungus as indicated employing the procedure given in Example 12. In this test, the product of Example 15 affords greater than 60% disease control at a concentration equivalent to 128 lbs./acre.

Example 19

The product of Example 15 exhibits selective herbicidal activity as indicated by the test procedure given in Example 5. In this test, the product of Example 15 receives ratings of 1000 p.p.m. for the radish species and 10–100 p.p.m. for the rye grass species.

Example 20

The product of Example 15 demonstrates non-plant parasite nematocidal activity as indicated by the procedure given in Example 7, wherein the product of Example 15 affords 100% nematode mortality at a concentration of 500 p.p.m.

Example 21

PREPARATION OF 1,2,3,4,4,5,6-HEPTACHLOROCYCLOHEXYL TRICHLOROACETATE 0.1 mol. of p-chlorophenyl trichloroacetate is reacted with 0.6 mol. of chlorine over a period of 25–26 hours in a manner similar to that given in Example 15. The resulting product, $C_8H_4Cl_{10}O_2$, is isolated through distillation, the desired product boiling at 183°–192° C. at 1 mm. mercury pressure, and yielding heptachlorocyclohexyl trichloroacetate having a refractive index of $$n\frac{1.5624}{D}$$

at 22° C. as indicated by the following elemental analytical data:

| Element | Actual percent by weight | Calculated percent by weight |
|---|---|---|
| C | 19.62 | 19.73 |
| H | 0.93 | 0.83 |
| Cl | 71.5 | 72.8 |

Example 22

Fungicidal activity of the product of Example 21 is exhibited employing the procedure given in Example 3 previously. In this test, the product of Example 21 affords disease control for both the *A. oleracea* and *M. fructicola* at a concentration of 0.1–1.0 p.p.m.

Example 23

The product of Example 21 also demonstrates fungicidal activity employing the test given in Example 11. According to this test, the product of Example 21 affords greater than 50% early blight control at a concentration of 400 p.p.m.

Example 24

Herbicidal activity is indicated employing the procedure given in Example 5. In this test, the product of Example 21 receives ratings of 100–1000 p.p.m. for the radish and 10–100 p.p.m. for the rye grass species.

Example 25

Pre-emergent herbicidal activity is also indicated employing the test given in Example 6. The product of Example 21 causes the emergence of 75% of the broadleaf plants whereas only 25% of the grass-type plants emerge.

Example 26

The product of Example 21 also exhibits nematocidal activity. In the test given in Example 7, the product of Example 7 affords 100% nematode control at a concentration of 100 p.p.m.

Example 27

PREPARATION OF 1,2,3,4,5,6-HEXACHLOROCYCLOHEXYL ISOCYANATE

Phenyl isocyanate is addition-chlorinated in a manner similar to that given in Examples 1, 9, 15, and 21, that is, the addition-chlorination is carried out over a period of 22 hours in a sealed tube in the presence of black light employing carbon tetrachloride as a solvent. The resulting product is purified by filtering the crude reaction product and evaporating off the solvent. The desired isocyanate has a refractive index of $$n\frac{1.5712}{D}$$

at 24.5° C. This desired $C_7H_5Cl_6ON$ is also indicated by the following elemental analytical data:

| Element | Actual percent by weight | Calculated percent by weight |
|---|---|---|
| C | 25.20 | 25.30 |
| H | 1.41 | 1.51 |
| Cl | 63.0 | 64.0 |

Example 28

To demonstrate insecticidal activity of the product of Example 27, fourth instar larvae of the Mexican bean beetle, *Epilachna varivestis*, less than one day old within the instar, are employed. Paired seed leaves, excised from tendergreen bean plants, are dipped in a formulation of the test compound (2000 p.p.m. product of Example 27— 5% acetone–0.01% Triton X-155–balance water) until they are thoroughly wetted. The chemical deposit on the leaf is then dried and the paired leaves are separated. Each is placed in a 9 cm. Petri dish with a filter paper liner, and ten randomly selected larvae are introduced before the dish is closed. After three days exposure, better than 95% mortality of the larvae is observed.

*Example 29*

In order to demonstrate insecticidal activity of the product of Example 27, male German cockroaches, *Blattella germanica*, 8 to 9 weeks old, are anesthetized with carbon dioxide to facilitate handling and then dipped in a test compound formulation (2000 p.p.m. product of Example 27—5% acetone–0.01% Triton X-155–balance water) for 10 seconds, removed, free of excess liquid, and caged. Two lots of 10 insects each are exposed to this formulation, and mortality observations are recorded after three days. Employing the product of Example 27 at the above concentration better than 85% mortality is observed.

*Example 30*

Fungicidal activity is indicated employing the procedure given in Example 3, in which the product of Example 27 inhibits spore germination at 0.1–1.0 p.p.m. for both the *A. oleracea* and *M. fructicola*.

*Example 31*

The product of Example 27 exhibits fungicidal activity against the early blight fungus, *Alternaria solani*, and the late blight fungus, *Phytophthora infestans*, employing the procedure given in Example 11. In this test, the product of Example 27 causes 100% blight control at a concentration of 2000 p.p.m.

*Example 32*

Further herbicidal activity of the compounds of this invention is indicated employing the procedure given in Example 5. The product of Example 27 inhibits germination of both the radish and rye grass species at a concentration of 10–100 p.p.m.

*Example 33*

The product of Example 27 exhibits pre-emergent herbicidal activity employing the procedure given in Example 6. In this test, the subject isocyanate causes 40% of the broadleaf species seeds to germinate whereas 50% of the grass species germinate.

*Example 34*

The product of Example 27 also exhibits non-plant parasite nematocidal activity employing the procedure given in Example 7; the product of Example 27 affords 100% nematode mortality at a concentration of 100 p.p.m.

*Example 35*

PREPARATION OF BIS-(1,2,3,4,5,6-HEXACHLOROCYCLOHEXYL) CARBONATE

Diphenyl carbonate is addition-chlorinated in a manner similar to that given in previous Examples 1, 9, 15, 21, and 27 by employing a sealed tube and black light radiation; 6 moles of chlorine is mixed with 1 mole of diphenyl carbonate in the presence of carbon tetrachloride as solvent over a period of 17 hours. The resulting desired product is isolated by precipitation from a methanol-water mixture and dried, resulting in a product melting at 84°–90° C. This desired bis(hexachlorocyclohexyl)carbonate, $C_{13}H_{10}O_3Cl_{12}$, is further indicated by the following elemental analytical data:

| Element | Actual percent by weight | Calculated percent by weight |
|---|---|---|
| C | 25.3 | 24.4 |
| H | 1.7 | 1.58 |
| Cl | 63.4 | 66.5 |

A minor amount of bis-(polychlorophenyl)carbonate results as a by-product of this addition-chlorination. Typically, the phenyl groups contain from 1 to 4 substituted chlorine atoms.

*Example 36*

Employing the procedure given in Example 3, the product of Example 35 inhibits spore germination of the *A. oleracea* and *M. fructicola* at a concentration of 10–100 p.p.m.

*Example 37*

Further fungicidal activity of the product of Example 35 is indicated employing the procedure given in Example 11. In this test, the product of Example 35 affords 98% disease control against the early blight fungus and 77% disease control against the late blight fungus at a concentration of 2000 p.p.m.

*Example 38*

The product of Example 35 also exhibits herbicidal activity as indicated by the evaluation given in Example 5 previously. In this procedure, seeds of lamb's quarters and green foxtail plants are treated in a manner similar to the radish and rye grass plants in Example 5. Results of this test indicate that the product of Example 35 inhibits germination of half of the seeds of the test plants at a concentration of 100—1000 p.p.m.

*Example 39*

PREPARATION OF TRIS-(1,2,3,4,5,6-HEXACHLOROCYCLOHEXYL) PHOSPHATE

Triphenyl phosphate is addition-chlorinated in a manner similar to that given in Examples 1, 9, 15, 21, 27, and 35 by chemically reacting triphenyl phosphate with a saturated solution of chlorine in a sealed tube in the presence of black light radiation and carbon tetrachloride as solvent over a period of 16 hours. The resulting product is purified by recrystallization from cyclohexane yielding the desired, $C_{18}H_{15}Cl_{18}PO_4$, which decomposes at 120° C. and is further indicated by the following elemental analytical data:

| Element | Actual percent by weight | Calculated percent by weight |
|---|---|---|
| C | 26.2 | 22.4 |
| H | 2.2 | 1.56 |
| Cl | 60.2 | 66.2 |

*Example 40*

PREPARATION OF N-(1,2,3,4,5,6-HEXACHLOROCYCLOHEXYL) IMIDOCARBONYL CHLORIDE 0.137 mol. of phenyl imidocarbonyl chloride is addition-chlorinated with 0.60 mol. of chlorine in the presence of 20 ml. of carbon tetrachloride and black light radiation in a sealed tube over a period of 16 hours in a manner similar to that given in previous Examples 1, 9, 15, 21, 27, 35, and 39. The resulting product is isolated by recrystallization from carbon tetrachloride and hexane. This desired $C_7H_5Cl_8N$ melts at 138°–143° C. and is further indicated by the following elemental analytical data:

| Element | Actual percent by weight | Calculated percent by weight |
|---|---|---|
| C | 21.1 | 21.75 |
| H | 1.5 | 1.30 |
| Cl | 74.45 | 73.4 |

*Example 41*

PREPARATION OF N-(1,2,3,4,5,6-HEXACHLOROCYCLO-HEXYL) IMIDOCARBONYL CHLORIDE 0.137 mol. of N-phenyl imidocarbonyl chloride is addition-chlorinated with 0.47 mol. of chlorine in the presence of 20 ml. of carbon tetrachloride and black light radiation in a sealed tube over a period of 16 hours. The resulting product is recrystallized from carbon tetrachloride and N-hexane yielding a product melting at 129°–139° C. and indicated by the following elemental analytical data:

| Element | Actual percent by weight | Calculated percent by weight |
|---|---|---|
| C | 22.1 | 21.75 |
| H | 1.3 | 1.3 |
| Cl | 73.5 | 73.4 |

*Example 42*

Insecticidal activity of the product of Example 41 is indicated employing the procedure given in Example 29 previously. In this test, the product of Example 41 affords 100% roach mortality at a concentration of 2000 p.p.m.

*Example 43*

The product of Example 41 also has nematocidal activity in that employing the procedure given in Example 7 previously, the product of Example 41 affords 100% nematode mortality at a concentration of 1000 p.p.m.

*Example 44*

PREPARATION OF 1,2,3,4,5,6-HEXACHLOROCYCLO-HEXYL TRICHLOROACETATE

The preparation according to Example 1 is repeated with the exception that in place of the black light (ultraviolet radiation) as a catalyst, the chlorination is carried in the presence of gamma radiation. Similar yields and products as those obtained in Example 1 result, indicating that the black light radiation and gamma radiation are essentially equivalent for the purposes of this invention.

*Example 45*

HYDROLYSIS OF 1,2,3,4,5,6-HEXACHLOROCYCLOHEXYL TRICHLOROACETATE 15.0 g. (0.032 mol.) of 1,2,3,4,5,6-hexachlorocyclohexyl trichloroacetate is dissolved in 50 ml. of dioxane. To this 30 ml. of concentrated HCl dissolved in 60 ml. of water are added and the reactant mixture is refluxed for 1 hour. Upon reaction completion, the product is separated by extraction with chloroform, after which the chloroform is evaporated and the desired residue distilled at a temperature of 120°–124° C. at 39 mm. mercury pressure yielding the desired 2,4,6-trichlorophenol.

*Example 46*

HYDROLYSIS OF 1,2,3,4,5,6-HEXACHLOROCYCLOHEXYL TRIFLUOROACETATE

In a procedure similar to that given in Example 45, 1,2,3,4,5,6-hexachlorocyclohexyl trifluoroacetate is hydrolyzed by adding 0.08 mol. of the above cyclohexyl trifluoroacetate to a dioxane-water mixture at 10°–25° C. The resulting product is extracted with chloroform and upon distillation, 2,4,6-trichlorophenol results.

*Example 47*

To evaluate bactericidal activity, the compounds within the scope of this invention are mixed with distilled water containing 5% acetone and 0.01% Triton X-155. 5 ml. of the test formulation are put in each of 4 test tubes. To each test tube is added one of the organisms: *Erwinia amylovora*, *Xanthomonas phaseoli*, *Staphylococcus aureus* and *Escherichia coli* in the form of a bacterial suspension in a saline solution from potato-dextrose plates. The tubes are then incubated for 4 hours at 30° C. Transfers are then made to sterile broth with a standard 4 mm. loop and the thus-innoculated broth is incubated for 48 hours at 37° C. Using this procedure, the various compounds enumerated in Table II receive ratings of percentage growth inhibition as given in column 3 of Table II. Column 2 indicates the concentrations at which the test chemicals are applied.

TABLE II.—BACTERICIDAL ACTIVITY

| Test Compound | Concentration Employed, p.p.m. | Bacteria: percent growth inhibition ||||
|---|---|---|---|---|---|
| | | E. amylovora | X. phaseoli | S. aureus | E. coli |
| Product of Example 1—1,2,3,4,5,6-hexachlorocyclohexyl trichloroacetate | 1,000 | 100 | 100 | 100 | 100 |
| Product of Example 9—1,2,3,4,5,6-hexachlorocyclohexyl trifluoroacetate | 1,000 | 75 | 97 | 100 | 100 |
| Product of Example 15—1,2,3,4,5,6-hexachlorocyclohexyl chloroacetate | 1,000 | 100 | 100 | 100 | 100 |
| Product of Example 21—1,2,3,4,4,5,6-heptachlorocyclohexyl trichloroacetate | 500 | 100 | 100 | 100 | 100 |
| Product of Example 27—1,2,3,4,5,6-hexachlorocyclohexyl isocyanate | 250 | 100 | 100 | 100 | 100 |
| Product of Example 35—bis-(1,2,3,4,5,6-hexachlorocyclohexyl) carbonate | 250 | 10 | 15 | 25 | 57 |
| Product of Example 39—tris-(1,2,3,4,5,6-hexachlorocyclohexyl) phosphate | 250 | 20 | 20 | 20 | 5 |

It is to be understood that although the invention has been described with specific reference to particular embodiments thereof, it is not to be so limited, since changes and alterations therein may be made which are within the full intended scope of this invention as defined by the appended claims.

What is claimed is:

1. A halogenated ester represented by the structure

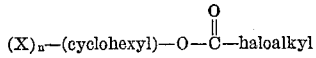

wherein X is halogen and n is a number greater than 4.

2. The method of preparing addition-halogenated cyclohexyl haloacetate which comprises introducing phenyl haloacetate into a pressure reactor, cooling the reactor to a temperature of about −50° to −60° C., adding about 5% to 30% molar excess of halogen, sealing the reactor, irradiating the reaction mixture with ultraviolet light and slowly warming the reaction mixture to room temperaure to addition halogenate the phenyl haloacetate and distillling at reduced pressure to separate the desired product.

3. The method of preparing 1,2,3,4,5,6-hexachlorocyclohexyl trichloroacetate which comprises introducing phenyl trichloroacetate into a pressure reactor, cooling the reactor to a temperature of about −50° to −60° C., adding about 5% to 30% molar excess of chlorine, sealing the reactor, irradiating the reaction mixture with ultraviolet light and slowly warming the reaction mixture to room temperature to addition chlorinate the phenyl trichloroacetate and distilling at reduced pressure to separate the 1,2,3,4,5,6-hexachlorocyclohexyl trichloroacetae.

4. The method of producing 1,2,3,4,5,6-hexachlorocyclohexyl trifluoroacetate which comprises introducing phenyl trifluoroacetate into a pressure reactor, cooling the reactor to a temperature of about −50° to −60° C., adding about 5% to 30% molar excess of chlorine, sealing the reactor, irradiating the reaction mixture with ultraviolet light and slowly warming the reaction mixture to room temperature to addition chlorinate the phenyl trifluoroacetate and distilling at reduced pressure to separate the 1,2,3,4,5,6-hexachlorocyclohexyl trifluoroacetate.

5. The method of preparing 1,2,3,4,5,6-hexachlorocyclohexyl chloroacetate which comprises introducing phenyl chloroacetate into a pressure reactor, cooling the reactor to a temperature of about −50° to −60° C., adding about 5% to 30% molar excess of chlorine, sealing the reactor, irradiating the reaction mixture with ultraviolet light and slowly warming the reaction mixture to room temperature to addition chlorinate the phenyl chloroacetate and distilling at reduced pressure to separate the 1,2,3,4,5,6-hexachlorocyclohexyl chloroacetate.

6. The method of preparing 1,2,3,4,4,5,6-heptachlorocyclohexyl trichloroacetate which comprises introducing p-chlorophenyl trichloroacetate into a pressure reactor, cooling the reactor to a temperature of about −50° to −60° C., adding about 5% to 30% molar excess of chlorine, sealing the reactor, irradiating the reaction mixture with ultraviolet light and slowly warming the reaction mixture to room temperature to addition chlorinate the p-chlorophenyl trichloroacetate and distilling at reduced pressure to separate the 1,2,3,4,4,5,6-heptachlorocyclohexyl trichloroacetate.

7. 1,2,3,4,5,6-hexachlorocyclohexyl trichloroacetate.
8. 1,2,3,4,5,6-hexachlorocyclohexyl trifluoroacetate.
9. 1,2,3,4,5,6-hexachlorocyclohexyl chloroacetate.
10. 1,2,3,4,4,5,6-heptachlorocyclohexyl trichloroacetate.
11. The method of controlling fungus growth which comprises contacting fungi spore with a fungicidal amount of 1,2,3,4,5,6-hexachlorocyclohexyl trichloroacetate.
12. The method of controlling fungus growth which comprises applying to the soil a fungicidal amount of 1,2,3,4,5,6-hexachlorocyclohexyl trichloroacetate.

References Cited in the file of this patent
UNITED STATES PATENTS

| | | |
|---|---|---|
| 2,010,841 | Bender | Aug. 13, 1935 |
| 2,657,166 | Stonecipher | Oct. 27, 1953 |
| 2,662,924 | Humphreys | Dec. 15, 1953 |
| 2,725,404 | Montes | Nov. 29, 1955 |
| 2,841,593 | Ecke | July 1, 1958 |

FOREIGN PATENTS

| | | |
|---|---|---|
| 5,595 | Japan | July 26, 1957 |